(12) United States Patent
Yoon et al.

(10) Patent No.: US 9,798,184 B2
(45) Date of Patent: Oct. 24, 2017

(54) PRESSURE-SENSITIVE ADHESIVE COMPOSITION

(71) Applicant: LG CHEM LTD., Seoul (KR)

(72) Inventors: Sung Soo Yoon, Daejeon (KR); No Ma Kim, Daejeon (KR); Kee Young Kim, Daejeon (KR); Min Ki Lee, Daejeon (KR); Han Na Chi, Seoul (KR)

(73) Assignee: LG CHEM, LTD., Seoul (KR)

( * ) Notice: Subject to any disclaimer, the term of this patent is extended or adjusted under 35 U.S.C. 154(b) by 599 days.

(21) Appl. No.: 14/030,883

(22) Filed: Sep. 18, 2013

(65) Prior Publication Data

US 2014/0016067 A1 Jan. 16, 2014

Related U.S. Application Data

(63) Continuation of application No. PCT/KR2012/002159, filed on Mar. 23, 2012.

(30) Foreign Application Priority Data

Mar. 23, 2011 (KR) .................. 10-2011-0025996
Mar. 23, 2012 (KR) .................. 10-2012-0029989

(51) Int. Cl.
| | | |
|---|---|---|
| *G02F 1/1335* | (2006.01) | |
| *C09J 133/06* | (2006.01) | |
| *C09J 7/02* | (2006.01) | |
| *C09J 175/04* | (2006.01) | |
| *C08G 18/62* | (2006.01) | |
| *C08G 18/76* | (2006.01) | |
| *C08G 18/80* | (2006.01) | |
| *G02B 5/30* | (2006.01) | |

(52) U.S. Cl.
CPC ... *G02F 1/133528* (2013.01); *C08G 18/6229* (2013.01); *C08G 18/7642* (2013.01); *C08G 18/8029* (2013.01); *C09J 7/0217* (2013.01); *C09J 133/06* (2013.01); *C09J 133/066* (2013.01); *C09J 175/04* (2013.01); *B32B 2457/202* (2013.01); *C08G 2170/40* (2013.01); *G02B 5/3033* (2013.01); *Y10T 428/1041* (2015.01); *Y10T 428/1059* (2015.01); *Y10T 428/1077* (2015.01); *Y10T 428/1082* (2015.01); *Y10T 428/2891* (2015.01)

(58) Field of Classification Search
CPC .......... G02F 1/133528; C08G 18/6229; C08G 18/8029; C08G 18/7642; C08G 2170/40; C09J 133/066; C09J 133/06; C09J 175/04; C09J 7/0217; B32B 2457/202; Y10T 428/1082; Y10T 428/1059; Y10T 428/1077; Y10T 428/1041; Y10T 428/2891; G02B 5/3033
See application file for complete search history.

(56) References Cited

U.S. PATENT DOCUMENTS

| | | | |
|---|---|---|---|
| 2005/0197450 A1* | 9/2005 | Amano | C08K 5/0075 525/30 |
| 2006/0057368 A1* | 3/2006 | Kobayashi | C09J 7/0217 428/343 |
| 2011/0117296 A1* | 5/2011 | Jang | C09J 133/062 428/1.33 |
| 2012/0086892 A1* | 4/2012 | Kim | C09J 175/04 349/96 |
| 2014/0016069 A1 | 1/2014 | Kim et al. | |

FOREIGN PATENT DOCUMENTS

| | | | | |
|---|---|---|---|---|
| CN | 101910346 A | | 12/2010 | |
| JP | 2005097451 A | * | 4/2005 | ............ C09J 133/04 |
| JP | 2007092056 A | | 4/2007 | |
| JP | 2008069261 A | | 3/2008 | |
| JP | 2009051983 A | * | 3/2009 | .............. C08L 33/14 |
| JP | 2010121118 A | | 6/2010 | |
| JP | 2010132891 A | | 6/2010 | |
| KR | 1020050072567 A | | 7/2005 | |
| KR | 1020090078204 A | | 7/2009 | |
| KR | WO 2010002196 A2 | * | 1/2010 | .......... C09J 133/062 |
| KR | WO 2010120105 A2 | * | 10/2010 | .............. C09J 11/06 |
| TW | 201309769 A1 | | 3/2013 | |
| WO | 2008032762 A1 | | 3/2008 | |

\* cited by examiner

*Primary Examiner* — Eli D Strah
(74) *Attorney, Agent, or Firm* — Dentons US LLP

(57) ABSTRACT

A pressure-sensitive adhesive composition is provided. The pressure-sensitive adhesive composition shows stable antistatic performance, and in particular, stably maintains its antistatic performance even when the pressure-sensitive adhesive composition is kept for an extended time under extreme conditions or conditions in which environmental changes are severe, and also has excellent general physical properties such as pressure-sensitive adhesive properties, durability and workability.

23 Claims, No Drawings

PRESSURE-SENSITIVE ADHESIVE COMPOSITION

This application is a Continuation Bypass Application of International Patent Application No. PCT/KR2012/002159, filed Mar. 23, 2012, which claims priority to and the benefit of Korean Patent Application Nos. 10-2011-0025996, filed Mar. 23, 2011, and 10-2012-0029989, filed Mar. 23, 2012, in the Korean Intellectual Property Office, the disclosures of which are incorporated herein by reference in their entirety.

BACKGROUND

1. Field of the Invention

The present application relates to a pressure-sensitive adhesive composition.

2. Discussion of Related Art

In general, the generation of static electricity causes a variety of problems across the entire electronics industry. The static electricity draws fine dust to the electronic parts, causing temporary or permanent damage or malfunction or process delay of the parts in addition to mechanical damage. In order to solve these problems, there is a continuous need to improve antistatic technology with development of the electronics industry.

SUMMARY OF THE INVENTION

The present application is directed to providing a pressure-sensitive adhesive composition.

One aspect of the present application provides a pressure-sensitive adhesive composition including an acrylic polymer and an antistatic agent. Here, the acrylic polymer includes 35 parts by weight to 79.9 parts by weight of (meth)acrylic acid ester monomer, 10 parts by weight to 30 parts by weight of monomer comprising hydroxyl group, 0.1 parts by weight to 1 parts by weight of monomer comprising carboxyl group and 10 parts by weight to 30 parts by weight of monomer having an alkylene oxide unit as polymerized units, and the pressure-sensitive adhesive composition satisfies the following General Formula 1.

$$\Delta SR_A = \log SR2 - \log SR1 \leq 1.0 \quad \text{General Formula 1}$$

In the General Formula 1, SR1 is a surface resistance measured after curing the pressure-sensitive adhesive composition and then maintaining it for 24 hours under the condition of 23° C. and 50% relative humidity (R.H.), and SR2 is a surface resistance measured after curing the same pressure-sensitive adhesive composition as used for the measurement of SR1, maintaining it for 500 hours under the condition of 60° C. and 90% R.H. and then maintaining it again for 24 hours under the condition of 23° C. and 50% R.H.

The pressure-sensitive adhesive composition may preferably satisfy the requirements of the following General Formula 2.

$$\Delta SR_B = \log SR3 - \log SR1 \leq 1.0 \quad \text{General Formula 2}$$

In the General Formula 2, SR1 is the same as defined in the General Formula 1, and SR3 is a surface resistance measured after curing the same pressure-sensitive adhesive composition as used for the measurement of SR1, maintaining it for 500 hours under the condition of 80° C., and then maintaining it again for 24 hours under the conditions of 23° C. and 50% R.H.

Hereinafter, the pressure-sensitive adhesive composition will be described in detail.

According to one illustrative embodiment, the pressure-sensitive adhesive composition may be a pressure-sensitive adhesive for optical films which is used for attachment of an optical film. More particularly, the pressure-sensitive adhesive composition may be used to attach a polarizing plate to a liquid crystal panel or to attach functional optical films, such as a polarizing plate, a retardation plate and a viewing-angle widening film, to each other. According to another illustrative embodiment, the pressure-sensitive adhesive composition may be a pressure-sensitive adhesive composition for polarizing plates which is used to attach a polarizing plate to a liquid crystal panel.

The pressure-sensitive adhesive composition includes an acrylic polymer. The acrylic polymer includes a (meth)acrylic acid ester monomer at 35 parts by weight to 79.9 parts by weight, a monomer comprising hydroxyl group at 10 parts by weight to 30 parts by weight, a monomer comprising carboxyl group at 0.1 parts by weight to 1 parts by weight and a monomer having an alkylene oxide unit at 10 parts by weight to 30 parts by weight as polymerized units.

As such, an alkyl(meth)acrylate may be, for example, used as the (meth)acrylic acid ester monomer, and an alkyl(meth)acrylate containing an alkyl group having 1 to 14 carbon atoms may be used in consideration of the cohesion, glass transition temperature or pressure-sensitive adhesive property of a pressure-sensitive adhesive. Examples of such a monomer may include methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl(meth)acrylate, lauryl(meth)acrylate and tetradecyl(meth)acrylate. Among these, one or two or more components may be included as polymerized units in the acrylic polymer.

A monomer comprising hydroxyl group included in the acrylic polymer is a monomer that may be copolymerized with a monomer which may form a polymer such as a (meth)acrylic acid ester monomer and also provide a hydroxyl group to a side chain or end of the polymer after the copolymerization. Examples of such a copolymerizable monomer which may be used herein may include an alkyl (meth)acrylate such as 2-hydroxyethyl(meth)acrylate, 4-hydroxybutyl(meth)acrylate, 5-hydroxypentyl(meth)acrylate, 6-hydroxyhexyl(meth)acrylate, 8-hydroxyoctyl(meth)acrylate, 2-hydroxypropyl(meth)acrylate, 10-hydroxydecyl(meth)acrylate, (4-hydroxymethyl cyclohexyl)methyl(meth)acrylate or 2-hydroxy butyl(meth)acrylate. In addition to the alkyl(meth)acrylate, the copolymerizable monomer which may be used herein may include a monomer such as caprolactone-modified 2-hydroxyethyl(meth)acrylate, 2-acryloyloxyethyl-2hydroxy ethyl phthalic acid, N-methylol(meth)acrylamide, N-hydroxyethyl(meth)acrylamide, 2-hydroxy-3-phenoxy propyl(meth)acrylate, 3-chloro-2-hydroxypropyl(meth)acrylate, 2-hydroxy-3-phenoxy propyl(meth)acrylate, 2,2-dimethyl-2hydroxyethyl(meth)acrylate, 2-hydroxyethyleneglycol(meth)acrylate or 2-hydroxypropyleneglycol(meth)acrylate.

The monomer comprising carboxyl group included in the acrylic polymer is a monomer that may be copolymerized with a monomer that may form a polymer and provide a carboxyl group to a side chain or end of the polymer after the copolymerization. Examples of such a copolymerizable monomer may include (meth)acrylic acid, crotonic acid, maleic acid, maleic anhydride, itaconic acid, fumaric acid, cinnamic acid, acrylamide N-glycollic acid, a Michael adduct of (meth)acrylic acid or 2-(meth)acryloyloxy ethyl dicarboxylic acid monoester, but the present application is not limited thereto. As such, examples of the Michael adduct of (meth)acrylic acid may include a (meth)acrylic acid dimer, a (meth)acrylic acid trimer or (meth)acrylic acid tetramer, and examples of the 2-(meth)acryloyloxy ethyl dicarboxylic acid monoester may include a 2-(meth)acryloyloxyethyl succinic acid monoester, a 2-(meth)acryloyloxyethyl phthalic acid monoester or a 2-(meth)acryloyloxyethyl hexahydrophthalic acid monoester, but the present application is not limited thereto.

As such, the monomer having an alkylene oxide unit may also be copolymerized with a monomer that may form a polymer, and examples of the monomer having an alkylene oxide unit may include a monomer represented by the following Formula 1.

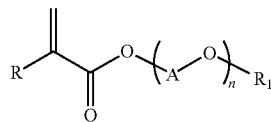

Formula 1

In Formula 1, R represents hydrogen or an alkyl group, A represents an alkylene, $R_1$ represents an alkyl group or an aryl group, and n represents an integer ranging from 1 to 12 or 1 to 6.

In definitions of the substituents in Formula 1, the alkyl group represents a linear, branched or cyclic alkyl group having 1 to 20 carbon atoms, 1 to 16 carbon atoms, 1 to 12 carbon atoms, 1 to 8 carbon atoms, or 1 to 4 carbon atoms, and the alkylene represents a linear, branched or cyclic alkylene having 1 to 20 carbon atoms, 1 to 16 carbon atoms, 1 to 12 carbon atoms, 1 to 8 carbon atoms, or 1 to 4 carbon atoms, and the aryl group represents an aryl group having 6 to 20 carbon atoms or 6 to 12 carbon atoms, for example, a phenyl group.

More specific examples of the monomer of Formula 1 may include at least one selected from the group consisting of alkoxy dialkyleneglycol (meth)acrylic acid ester, alkoxy trialkyleneglycol (meth)acrylic acid ester, alkoxy tetraalkyleneglycol (meth)acrylic acid ester, aryloxy dialkyleneglycol (meth)acrylic acid ester, aryloxy trialkyleneglycol (meth)acrylic acid ester and aryloxy tetraalkyleneglycol (meth)acrylic acid ester, but the present application is not limited thereto. In the specific examples of the monomer, the alkoxy may preferably be an alkoxy having 1 to 4 carbon atoms, and more preferably methoxy or ethoxy, the alkyleneglycol may include an alkyleneglycol having 1 to 4 carbon atoms, preferably ethyleneglycol or propyleneglycol, and examples of the aryloxy may include an aryloxy having 6 to 12 carbon atoms, preferably phenoxy.

The acrylic polymer may include the (meth)acrylic acid ester monomer at 35 parts by weight to 79.9 parts by weight, the monomer comprising hydroxyl group at 10 parts by weight to 30 parts by weight, the monomer comprising carboxyl group at 0.1 parts by weight to 1 parts by weight and the monomer having an alkylene oxide unit at 10 parts by weight to 30 parts by weight as the polymerized units. According to another illustrative embodiment, the acrylic polymer may include the (meth)acrylic acid ester monomer at 59.5 parts by weight to 79.9 parts by weight, the monomer comprising hydroxyl group at 10 parts by weight to 20 parts by weight, the monomer comprising carboxyl group at 0.1 parts by weight to 0.5 parts by weight and the monomer having an alkylene oxide unit at 10 parts by weight to 20 parts by weight as the polymerized units. Within the range of such a weight ratio, excellent physical properties, particularly adhesive strength or durability, of the pressure-sensitive adhesive may be maintained, and a stable antistatic property of the pressure-sensitive adhesive may also be maintained without any time-dependent changes, even when the pressure-sensitive adhesive is exposed to severe conditions such as high-temperatures or high-temperatures/humidity for an extended period of time.

The unit "part(s) by weight" used herein means a weight ratio between respective components.

The acrylic polymer may further include a monomer represented by the following Formula 2 as a polymerized unit, as necessary. The monomer of Formula 2 may be added to adjust a glass transition temperature and provide other functionalities.

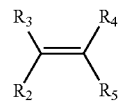

Formula 2

In Formula 2, $R_2$ to $R_4$ each independently represent hydrogen or an alkyl, and $R_5$ represents cyano; phenyl substituted or unsubstituted with an alkyl; an acetyloxy; or $COR_6$, provided that $R_6$ represents amino or glycidyloxy substituted or unsubstituted with an alkyl or alkoxyalkyl.

In definitions of $R_2$ to $R_6$ in Formula 2, the alkyl or alkoxy refers to an alkyl or alkoxy having 1 to 8 carbon atoms, preferably methyl, ethyl, methoxy, ethoxy, propoxy or butoxy.

The monomer of Formula 2 may be included in an amount of 20 parts by weight or less in the polymer, but the content of the monomer may be varied according to a purpose.

The acrylic polymer may be prepared by subjecting a mixture of monomers, which is obtained by blending a variety of the above-described polymers at desired weight ratios, to a conventional polymerization method such as solution polymerization, photopolymerization, bulk polymerization, suspension polymerization or emulsion polymerization.

For example, at least one selected from the group consisting of an ionic compound and a metal salt, which are present in a liquid phase at room temperature, may be used as the antistatic agent included in the pressure-sensitive adhesive composition. Preferably, the ionic compound and the metal salt may be used together.

As such, the ionic compound is present in a liquid phase at room temperature. The term "room temperature" refers to a naturally occurring atmospheric temperature at which an adhesive film is not heated or cooled, for example, a temperature of approximately 10° C. to 30° C., more particularly approximately 15° C. to 30° C., and further particularly approximately 25° C. The ionic compound, which is present in a liquid phase at room temperature, may be used to secure suitable antistatic properties and simultaneously maintain excellent properties of the pressure-sensitive adhesive, such as optical properties, pressure-sensitive adhesive properties and workability. Also, even when the pressure-sensitive adhesive is kept or stored for an extended period of time, it is possible to prevent precipitation of the ionic compound from the pressure-sensitive adhesive and time-dependent change or degradation of the optical transparency or pressure-sensitive adhesive property of the pressure-sensitive adhesive.

The ionic compound may preferably be an organic salt. According to one illustrative embodiment, the ionic compound may be an organic salt including a cationic component such as quaternary ammonium, phosphonium, pyridinium, imidazolium, pyrrolidinium or piperidinium.

The organic salt may preferably include a quaternary ammonium cation. According to one illustrative embodiment, the quaternary ammonium cation may be represented by the following Formula 3.

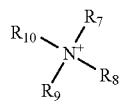

Formula 3

In Formula 3, $R_7$ to $R_{10}$ each independently represent hydrogen, an alkyl, an alkoxy, an alkenyl or an alkynyl.

In definitions of the substituents in Formula 3, the alkyl or alkoxy may be an alkyl or alkoxy having 1 to 20 carbon atoms, 1 to 12 carbon atoms, 1 to 8 carbon atoms or 1 to 4 carbon atoms. Also, the alkyl or alkoxy may be a linear, branched or cyclic alkyl or alkoxy, and may be optionally substituted with one or more substituents.

Also, in definitions of the substituents in Formula 3, the alkenyl or alkynyl may be an alkenyl or alkynyl having 2 to 20 carbon atoms, 2 to 12 carbon atoms, 2 to 8 carbon atoms or 2 to 4 carbon atoms. In addition, the alkenyl or alkynyl may be a linear, branched or cyclic alkenyl or alkynyl, and may be optionally substituted with one or more substituents.

In definitions of the substituents in Formula 3, when the alkyl, alkoxy, alkenyl or alkynyl is substituted with one or more substituents, examples of the substituent may include hydroxy, alkyl, alkoxy, alkenyl, alkynyl, cyano, thiol, amino, aryl or heteroaryl, but the present application is not limited thereto.

In one embodiment, $R_7$ to $R_{10}$ in Formula 3 may each independently represent an alkyl, preferably a linear or branched alkyl having 1 to 12 carbon atoms. More preferably, $R_7$ to $R_{10}$ each independently represent a linear or branched alkyl having 1 to 12 carbon atoms, with the proviso that $R_7$ to $R_{10}$ may not an alkyl having the same numbers of carbon atoms at the same time. That is, in this illustrative embodiment, it is preferred that $R_7$ to $R_{10}$ are not an alkyl having the same number of carbon atoms. When all of $R_7$ to $R_{10}$ represent an alkyl having the same number of carbon atoms, the probability that the organic salt is present in a solid phase at room temperature may be increased.

Specific examples of the cation of Formula 3 may include N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, which may be used alone or in combination.

According to one illustrative embodiment, a cation in which $R_7$ in Formula 3 is an alkyl having 1 to 3 carbon atoms and $R_8$ to $R_{10}$ each independently represent an alkyl having 4 to 20 carbon atoms, preferably 4 to 15 carbon atoms, and more preferably 4 to 10 carbon atoms, may be used herein. Such a cation may be used to provide a pressure-sensitive adhesive having more excellent properties such as optical properties, pressure-sensitive adhesive properties, workability and antistatic properties.

Examples of the anion that may be included in the organic salt may include an anion represented by the following Formula 4.

Formula 4

In Formula 4, X represents nitrogen or carbon, Y represents carbon or sulfur, $R_f$ represents a perfluoroalkyl group, m represents an integer of 1 or 2, and n represents an integer of 2 or 3.

In Formula 4, m may be 1 when Y is carbon, m may be 2 when Y is sulfur, n may be 2 when X is nitrogen, and n may be 3 when X is carbon.

The anion of Formula 4 shows high electronegativity due to the presence of the perfluoroalkyl group ($R_f$), and also has a unique resonance structure. As a result, the anion of Formula 4 may form a weak bond with the cation of Formula 3, and simultaneously show high hydrophobicity. Therefore, the organic salt may show excellent compatibility with the other components (such as the acrylic polymer) of the composition, and also provide good antistatic properties even when a small amount of the organic salt is used.

According to one illustrative embodiment, the $R_f$ in Formula 4 may be a perfluoroalkyl group having 1 to 20 carbon atoms, 1 to 12 carbon atoms, 1 to 8 carbon atoms or 1 to 4 carbon atoms. In this case, the perfluoroalkyl group may have a linear, branched or cyclic structure. The anion of Formula 4 may be a sulfonylmethide-based, sulfonylimide-based, carbonylmethide-based or carbonylimide-based anion, and, more particularly, may include tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanecarbonylimide or bispentafluoroethanecarbonylimide, which may be used alone or in combination.

According to one illustrative embodiment, the anion of Formula 4 may preferably be bis(perfluoroalkylsulfonylimide). Here, the perfluoroalkyl may be a perfluoroalkyl having 1 to 12 carbon atoms, preferably 1 to 8 carbon atoms.

For example, a metal salt including an alkaline metal cation or an alkaline earth metal cation may be used as the metal salt, and a metal salt including an alkaline metal cation may preferably be used. Examples of the cation may include a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$) and a barium ion ($Ba^{2+}$), which may be used alone or in combination. According to this embodiment, one or two or more of a lithium ion, a sodium ion, a potassium ion, a magnesium ion, a calcium ion and a barium ion may be preferably used, and a lithium ion may be more preferably used in consideration of ion stability and mobility in a pressure-sensitive adhesive, but the present application is not limited thereto.

Examples of the anion that may be included in the metal salt may include fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-toluenesulfonate ($CH_3C_6H_4SO_3^-$), tetraborate ($B_4O_7^{2-}$), carboxybenzenesulfonate ($COOH(C_6H_4)SO_3^-$), trifluoromethanesulfonate ($CF_3SO_2^-$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$) or trispentafluoroethyl trifluorophosphate ($P(C_2F_5)_3F_3^-$), and the anion of Formula 4, which may be selected and used alone or in combination. According to one illustrative embodiment, the anion that may be used herein may include an imide-based anion, which is good at functioning as an electron withdrawing group, is substituted with fluorine having hydrophobicity and has high ion stability, but the present application is not limited thereto.

In the pressure-sensitive adhesive composition, the antistatic agent may be included in an amount of 0.1 parts by weight to 20 parts by weight, preferably 0.1 parts by weight to 15 parts by weight, relative to 100 parts by weight of the acrylic polymer. Also, when the antistatic agent includes both of the ionic compound and the metal salt and the antistatic agent falls within this content range, the ionic compound may be included in an amount of 0.05 parts by weight or more, relative to 100 parts by weight of the acrylic polymer, and the metal salt may be included in an amount of 10 parts by weight or less, relative to 100 parts by weight of the acrylic polymer.

The weight ratio of the antistatic agent may be adjusted as described above so that the pressure-sensitive adhesive can show stable antistatic performance, maintain the stable antistatic performance even when the pressure-sensitive adhesive is kept for a long time under the extreme conditions or conditions in which environmental changes are severe, and also effectively maintain the workability, durability or optical properties of the pressure-sensitive adhesive, as well as the re-peelability.

The pressure-sensitive adhesive composition may further include a multifunctional cross-linking agent as a component that may cross-link the acrylic polymer during a curing process. For example, an isocyanate cross-linking agent, an epoxy cross-linking agent, an aziridine cross-linking agent or a metal chelate cross-linking agent may be used as the multifunctional cross-linking agent, and the use of the isocyanate cross-linking agent is preferred.

For example, the isocyanate cross-linking agent that may be used herein may include a diisocyanate compound such as tolylene diisocyanate, xylene diisocyanate, diphenylmethane diisocyanate, hexamethylene diisocyanate, isoboron diisocyanate, tetramethylxylene diisocyanate or naphthalene diisocyanate, or a compound obtained by reaction of the diisocyanate compound with a polyol. As such, the polyol may, for example, include trimethylol propane. Also, the epoxy cross-linking agent may include at least one selected from the group consisting of ethyleneglycol diglycidyl ether, triglycidyl ether, trimethylolpropane triglycidyl ether, N,N,N',N'-tetraglycidyl ethylenediamine and glycerin diglycidyl ether, and the aziridine cross-linking agent may include at least one selected from the group consisting of N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinyl phosphinoxide, but the present application is not limited thereto. In addition the metal chelate-based cross-linking agent may include a compound in which a multivalent metal such as aluminum, iron, zinc, tin, titanium, antimony, magnesium and/or vanadium coordinates with acetylacetone or ethyl acetoacetate. Among these, one or two or more of the cross-linking agents may be used in the present application, but the cross-linking agent that may be used herein is not limited thereto.

Such a multifunctional cross-linking agent may be, for example, included in an amount of 0.01 parts by weight to 5 parts by weight, relative to 100 parts by weight of the above-described acrylic polymer. The excellent cohesion or durability of the pressure-sensitive adhesive may be maintained within this content range, and the storage stability may also be enhanced even when the pressure-sensitive adhesive is stored for an extended period of time.

Also, the pressure-sensitive adhesive composition may further include a silane coupling agent. The silane coupling agent may function to increase the close adhesion and adhesive stability of the pressure-sensitive adhesive, and thus functions to improve heat resistance and moisture resistance and enhance adhesive reliability even when the pressure-sensitive adhesive is kept for an extended period of time under extreme conditions. For example, the silane coupling agent that may be used herein may include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane or γ-aminopropyl triethoxy silane, which may be used alone or in combination.

According to one illustrative embodiment, the pressure-sensitive adhesive composition may include a silane coupling agent having a β-cyano group or an acetoacetyl group. For example, the coupling agent may include a compound represented by the following Formula 5 or 6.

$(R_{11})_nSi(R_{12})_{(4-n)}$                                     Formula 5

$(R_{13})_nSi(R_{12})_{(4-n)}$                                     Formula 6

In Formula 5 or 6, $R_{11}$ represents a β-cyanoacetyl group, $R_{13}$ represents an acetoacetyl group or an acetoacetylalkyl group, $R_{12}$ represents an alkoxy group, and n represents an integer ranging from 1 to 3.

In Formula 5 or 6, the alkyl may be an alkyl having 1 to 20 carbon atoms, 1 to 16 carbon atoms, 1 to 12 carbon atoms, 1 to 8 carbon atoms or 1 to 4 carbon atoms. In this case, such an alkyl may be linear, branched or cyclic.

In Formula 5 or 6, the alkoxy may be an alkoxy having 1 to 20 carbon atoms, 1 to 16 carbon atoms, 1 to 12 carbon atoms, 1 to 8 carbon atoms or 1 to 4 carbon atoms. In this case, such an alkoxy may be linear, branched or cyclic.

In addition, n in Formula 5 or 6 may preferably be 1 to 2, and more preferably 1.

For example, examples of the compound of Formula 5 or 6 may include acetoacetylpropyl trimethoxy silane, acetoacetylpropyl triethoxy silane, β-cyanoacetyl trimethoxy silane or β-cyanoacetyl triethoxy silane, but the present application is not limited thereto.

The silane coupling agent in the pressure-sensitive adhesive composition may be included in an amount of 0.01 parts by weight to 5 parts by weight, preferably 0.01 parts by weight to 1 part by weight, relative to 100 parts by weight of the acrylic polymer. Within this content range, the silane coupling agent may function to effectively endow a pressure-sensitive adhesive with desired physical properties.

The pressure-sensitive adhesive composition may further include a tackifier, as necessary. For example, the tackifier may include a hydrocarbon resin or a hydrogenated product thereof, a rosin resin or a hydrogenated product thereof, a rosin ester resin or hydrogenated product thereof, a terpene resin or a hydrogenated product thereof, a terpene phenol resin or a hydrogenated product thereof, a polymerized rosin resin or polymerized rosin ester resin, which may be used alone or in combination, but the present application is not limited thereto. In the pressure-sensitive adhesive composition, the tackifier may be included in an amount of 100 parts by weight or less, relative to 100 parts by weight of the acrylic polymer.

Also, the pressure-sensitive adhesive composition may further include at least one additive selected from the group consisting of an epoxy resin, a curing agent, a UV stabilizer, an antioxidant, a coloring agent, a reinforcing agent, a filler, an antifoaming agent, a surfactant and a plasticizer, without affecting the effects of the present application.

As described above, the pressure-sensitive adhesive composition satisfies the requirements of General Formula 1, preferably the requirements of General Formulas 1 and 2.

In definitions of General Formulas 1 and 2, the term "curing" refers to a process of transforming a pressure-sensitive adhesive composition to express a pressure-sensitive adhesivity through a physical or chemical reaction or action. Such curing may be, for example, a process of treating a pressure-sensitive adhesive composition under conditions in which an acrylic polymer and a multifunctional cross-linking agent included in the composition may trigger a cross-linking reaction.

As such, the abbreviation "R.H." also refers to relative humidity.

Specific conditions and methods of measuring the surface resistance of General Formulas 1 and 2 are described with reference to the following Examples.

When $\Delta SR_A$ or $\Delta SR_B$ exceeds 1.0, the surface resistance of a composition when prepared into a pressure-sensitive adhesive is highly changed in a time-dependent manner. Therefore, application of the pressure-sensitive adhesive may be limited. Also, the lower the $\Delta SR_A$ and $\Delta SR_B$ become, the more advantageous the $\Delta SR_A$ and $\Delta SR_B$ become. As such, there are no particular lower limits of the $\Delta SR_A$ and $\Delta SR_B$.

In addition, the pressure-sensitive adhesive composition may have a gel content after curing of 50 weight % to 90 weight %, preferably 70 weight % to 90 weight %. The gel content after curing may be calculated from the following General Formula 3.

Gel fraction (%)=$B/A$×100    General Formula 3

In General Formula 3, "A" represents a weight of a cured product of the pressure-sensitive adhesive composition, and B represents a dry weight of a non-dissolved parts obtained after immersing the cured pressure-sensitive adhesive composition, of which a weight is "A," in ethyl acetate at room temperature for 72 hours.

When the gel fraction after curing is less than 50 weight %, the durability of the pressure-sensitive adhesive may be degraded under high temperature or high humidity conditions, whereas the stress relaxation of the pressure-sensitive adhesive may be degraded when the gel fraction after curing exceeds 90 weight %.

Also, the pressure-sensitive adhesive composition may have a peel strength of 150 gf/25 mm or more, or 250 gf/25 mm or more, as measured at a peel angle of 180 degrees, and a peel rate of 0.3 m/min after the composition in the form of a pressure-sensitive adhesive is attached to glass, for example soda lime glass. The peel strength may be, for example, measured after the pressure-sensitive adhesive composition is used to prepare a pressure-sensitive adhesive polarizing plate as will be describe later, and the prepared pressure-sensitive adhesive polarizing plate is attached to the glass and kept for 24 hours under the conditions of a temperature of 23° C. and 50% relative humidity. When the peel strength is set to 150 gf/25 mm or more, the pressure-sensitive adhesive composition for polarizing plates can have excellent durability. There is no particular lower limit on the peel strength. However, the peel strength may be adjusted to 2,500 gf/25 mm or less or 1,500 gf/25 mm or less in consideration of cuttability or re-peelability.

In addition, the present application is directed to providing a polarizing plate including a polarizer, and a pressure-sensitive adhesive layer. The pressure-sensitive adhesive layer is formed on one or both surfaces of the polarizer, is used to attach the polarizing plate to a liquid crystal panel, and also includes the pressure-sensitive adhesive composition in a cured state.

The polarizer is not particularly limited. Thus, any kind of polarizer known in the art may be used. The polarizer is a functional film that can extract light oscillating in only one direction from incident light oscillating in multiple directions. For example, such a polarizer may be configured so that a dichroic dye can adsorb to and be arranged on a polyvinylalcohol-based resin film. The polyvinylalcohol-based resin forming the polarizer may be, for example, obtained by geling a polyvinylacetate-based resin. In this case, the polyvinylacetate-based resin that may be used herein may include a homopolymer of vinyl acetate as well as a copolymer of vinyl acetate and another monomer copolymerizable with the vinyl acetate. As such, examples of the monomer copolymerizable with the vinyl acetate may include, but are not limited to, an unsaturated carbonic acid, an olefin, a vinylether, an unsaturated sulfonic acid and an acrylamid having an ammonium group, which may be used alone or in combination. The polarizer may be prepared by elongating the polyvinylalcohol-based resin film, staining the resin film with a dichroic dye to adsorb the resin film to the dichroic dye, treating the resin film with a aqueous boric acid solution and washing the resin film. Iodine or dichroic organic dyestuff may be used as the dichroic dye.

Also, the polarizing plate may further include a protective film which is attached to one or both surfaces of the polarizer. In this case, the pressure-sensitive adhesive layer may be formed on one surface of the protective film. Kinds of the protective film are not particularly limited. For example, the protective film that may be used herein may include a cellulose-based film such as triacetyl cellulose (TAC); a polyester-based film such as a polycarbonate film or poly(ethylene terephthalet) (PET); a polyethersulfone-based film; or a film having a single-layer structure or stacked structure of two or more layers, such as a polyethylene film, a polypropylene film or a polyolefin-based film formed of a resin having a cyclo-based or norbornene structure or an ethylene-propylene copolymer.

Also, the polarizing plate may further include at least one functional layer selected from the group consisting of a protective layer, a reflective layer, an anti-glare layer, a retardation plate, a wide-viewing angle compensation film and a brightness enhancement film.

A method of forming a pressure-sensitive adhesive layer on such a polarizing plate is not particularly limited. For example, the polarizing plate may be formed by coating and curing the above-described pressure-sensitive adhesive composition. In this process, the polarizing plate may be prepared by directly coating a pressure-sensitive adhesive composition onto a polarizing plate and curing the pressure-sensitive adhesive composition, or by coating a pressure-sensitive adhesive composition onto a release agent-treated surface of a release film and curing the pressure-sensitive adhesive composition, followed by transferring the pressure-sensitive adhesive composition to a polarizing plate.

The coating of the pressure-sensitive adhesive composition may be performed using a conventional device such as a bar coater.

In addition, a method of curing a pressure-sensitive adhesive composition is not particularly limited. For example, the method may be performed by maintaining the coating layer at a proper temperature so as to initiate a cross-linking reaction of a multifunctional cross-linking agent with an acrylic polymer included in the coating layer.

In addition, the present application is directed to providing a liquid crystal display device (LDC) including a liquid crystal panel and the polarizing plate attached to one or both surfaces of the liquid crystal panel.

In the LDC, various liquid crystal panels known in the art, for example, liquid crystal panels of active matrix mode such as twisted nematic (TN), super-twisted nematic (STN), ferroelectic (F) and polymer-dispersed (PD) modes; liquid crystal panels of active matrix mode such as two-terminal and three-terminal modes; liquid crystal panels of an in-plane switching (IPS) mode and a vertical alignment (VA) mode, may be applied as the liquid crystal panel.

Furthermore, the kinds of other components of the LCD, for example, upper/lower substrates (for example, a color filter substrate or an array substrate) are not particularly limited, and components known in the art may be used without limitation.

DETAILED DESCRIPTION OF EXEMPLARY EMBODIMENTS

Hereinafter, illustrative embodiments of the present application will be described in detail. However, the present application is not limited to the embodiments stated below and can be implemented in various forms. The following embodiments are described in order to enable those of ordinary skill in the art to embody and practice the present application.

PREPARATIVE EXAMPLE 1

Preparation of Acrylic Polymer (A)

69.7 parts by weight n-butyl acrylate (n-BA), 20 parts by weight methoxy ethyleneglycol acrylate (MEA). 18 parts by weight hydroxyethyl acrylate (HEA) and 0.3 parts by weight acrylic acid (AA) were put into a 1 L reactor, through which nitrogen gas was refluxed and with which a cooling device to facilitate the temperature control was equipped. 120 parts by weight ethyl acetate (EAc) was added as a solvent, and the reactor was purged with nitrogen gas for 60 minutes to remove oxygen. Subsequently, 0.05 parts by weight azobisisobutyronitrile (AIBN) was added as a reaction initiator while maintaining a temperature of 60° C., 0.01 parts by weight n-dodecylmercaptan (n-DDM) was then added, and the resulting mixture was reacted for approximately 8 hours. After the reaction, the mixture was diluted with EAc so that a solid content of the mixture could amount to approximately 25 weight %, thereby preparing an acrylic polymer (A) having a molecular weight (Mw) of 1,200,000 and a molecular weight distribution of 4.2.

PREPARATIVE EXAMPLES 2 to 9

Acrylic Polymers (B) to (I)

Acrylic polymers were prepared in the same manner as in Preparative Example 1, except that the polymerization conditions were adjusted as listed in the following Table 1 in consideration of a weight ratio and desired molecular weight (Mw) of a monomer during polymerization (in the case of Preparative Example 9, however, n-dodecyl mercaptan was not used).

TABLE 1

|  | Preparative Examples | | | | | | | | |
|---|---|---|---|---|---|---|---|---|---|
|  | 1 A | 2 B | 3 C | 4 D | 5 E | 6 F | 7 G | 8 H | 9 I |
| n-BA | 69.7 | 64.9 | 69.5 | 79.9 | 65 | 84 | 79.7 | 99 | 94 |
| EA | — | 5 | — | — | 5 | — | 5 | — | — |
| MEA | 20 | — | 10 | 10 | — | 15 | — | — | — |
| ECA | — | 15 | 5 | — | 15 | — | — | — | — |
| AA | 0.3 | 0.1 | 0.5 | 0.1 | 0.8 | — | 0.3 | — | 6 |
| 2-HEA | 18 | 15 | 15 | 10 | 10 | 1 | 15 | 1 | — |
| EAc | 120 | 120 | 120 | 120 | 120 | 120 | 120 | 120 | 120 |
| $M_w$ (×10,000) | 120 | 130 | 125 | 132 | 125 | 122 | 132 | 135 | 185 |
| Molecular weight distribution | 4.2 | 4.5 | 4.4 | 3.8 | 4.8 | 3.9 | 4.2 | 4.7 | 4.9 |

Content unit: part(s) by weight
n-BA: n-butyl acrylate
EA: ethyl acrylate
MEA: methoxy ethyleneglycol acrylate
ECA: ethoxyethoxyethyl acrylate
2-HEA: 2-hydroxyethyl acrylate
AA: acrylic acid
EAc: ethyl acetate

EXAMPLE 1

Preparation of Pressure-sensitive Adhesive Composition 1.0 parts by weight of an XDI-based isocyanate cross-linking agent (D110N commercially available from Mitsui Takeda Chemicals, Inc. Japan) and 1 part by weight trioctylmethylammonium bis(trifluorosulfonyl)imide were blended relative to 100 parts by weight of the solid content of the acrylic polymer (A) prepared in Preparative Example 1, 1 part by weight lithium bis(trifluoromethanesulfonyl) imide and 0.2 parts by weight of a (3-cyanoacetyl group-containing silane coupling agent (M812 commercially available from LG Chem. Ltd.) were further blended, and solid concentration in the resulting mixture was adjusted to 15 weight % to prepare a pressure-sensitive adhesive composition.

Preparation of Pressure-sensitive Adhesive Polarizing Plate

The prepared pressure-sensitive adhesive composition was coated onto a release agent-treated surface of a 38 μm-thick PET film (MRF-38 commercially available from Mitsubishi Corporation) release-treated as a release sheet so that a coating layer can have a thickness after drying of approximately 25 μm, and dried at 110° C. for 3 minutes in an oven to form a pressure-sensitive adhesive layer. Thereafter, the pressure-sensitive adhesive layer was laminated onto one surface of an iodine-based polarizing plate to prepare a pressure-sensitive adhesive polarizing plate.

EXAMPLES 2 to 7 and COMPARATIVE EXAMPLES 1 to 4

Pressure-sensitive adhesive compositions and pressure-sensitive adhesive polarizing plates were prepared in the same manner as in Example 1, except that components and weight ratios were adjusted during preparation of the pressure-sensitive adhesive composition as listed in the following Tables 2 and 3.

TABLE 2

| | Examples | | | | | | |
|---|---|---|---|---|---|---|---|
| | 1 | 2 | 3 | 4 | 5 | 6 | 7 |
| Polymer A | 100 | | | | | 100 | 100 |
| Polymer B | | 100 | | | | | |
| Polymer C | | | 100 | | | | |
| Polymer D | | | | 100 | | | |
| Polymer E | | | | | 100 | | |
| TOMA-TFSi | | | | | | 2 | 1 |
| LiTFSi | 2 | 2 | 2 | 2 | 2 | 0.5 | 5 |
| Cross-linking agent | 1.0 | 1.0 | 1.0 | 1.0 | 1.0 | 1.0 | 1.0 |
| M812 | 0.2 | 0.2 | 0.2 | 0.2 | 0.2 | 0.2 | 0.2 |

Content unit: part(s) by weight
TOMA-TFSi: trioctylmethylammonium-bis(trifluoromethanesulfonyl)imide
LiTFSi: lithium bis(trifluoromethanesulfonyl)imide
Cross-linking agent: XDI-based isocyanate cross-linking agent (D110N commercially available from Mitsui Takeda Chemicals, Inc., Japan)
M812: β-cyanoacetyl group-containing silane coupling agent (LG Chem. Ltd.)

TABLE 3

| | Comparative Examples | | | | |
|---|---|---|---|---|---|
| | 1 | 2 | 3 | 4 | 5 |
| Polymer F | 100 | | | | 100 |
| Polymer G | | 100 | | | |
| Polymer H | | | 100 | | |
| Polymer I | | | | 100 | |
| TOMA-TFSi | | | | | 5 |
| LiTFSi | 2 | 2 | 2 | 2 | 5 |
| Cross-linking agent | 1.0 | 1.0 | 1.0 | | 1.0 |
| T-743L | | | | 3.0 | |
| M812 | 0.2 | 0.2 | 0.2 | 0.2 | 0.2 |

Content unit: part(s) by weight
TOMA-TFSi: trioctylmethylammonium bis(trifluormethanesulfonyl)imide
LiTFSi: lithium bis(trifluoromethanesulfonyl)imide
Cross-linking agent: XDI-based isocyanate cross-linking agent (D110N commercially available from Mitsui Takeda Chemicals, Inc., Japan)
T-743L: epoxy cross-linking agent(Sosken Electronc Co. Ltd., Japan)
M812: β-cyanoacetyl group-containing silane coupling agent (LG Chem. Ltd.)

The physical properties of the pressure-sensitive adhesive polarizing plates were evaluated according to the following evaluation method.

1. Measurement of Gel Fraction//

A pressure-sensitive adhesive layer was maintained in a constant temperature/humidity chamber (23° C. and 60% relative humidity (R.H.)) for approximately 7 days, and then 0.3 g (A) of the pressure-sensitive adhesive was taken and put into a 200-mesh stainless wire net, and then immersed in 100 mL of ethyl acetate, and maintained at room temperature for 3 days in a dark room. A pressure-sensitive adhesive that was not dissolved in ethyl acetate after the storage was collected, and then dried at 70° C. for 4 hours. Thereafter, a weight (B) of the non-dissolved pressure-sensitive adhesive was measured, and a gel fraction was then measured by applying the measured weight (B) to the following Equation 1.

$$\text{Gel fraction (\%)} = B/A \times 100 \qquad \text{Equation 1}$$

In Equation 1, A represents a weight (0.3 g) of the pressure-sensitive adhesive before being immersed in ethyl acetate, and B represents a dry weight (units: g) of the non-dissolved parts.

2. Evaluation of Pressure-sensitive Adhesive Strength

A pressure-sensitive adhesive polarizing plate was cut into pieces having a width of 25 mm and a length of 100 mm, a releasable PET film was then removed, and the polarizing plate was then attached to an alkaline-free glass using a laminator. The attachment was performed according to JIS Z 0237 using a 2 kg roller. Thereafter, the polarizing plate was treated in an autoclave (50° C., 5 atm) for approximately 20 minutes, and stored for 24 hours under constant temperature/humidity conditions (23° C., 50% R.H.). The peel strength was evaluated using measuring equipment (Texture analyzer commercially available from Stable Micro Systems Ltd., G.B.) by peeling the polarizing plate from the glass at a peel rate of 300 mm/min and a peel angle of 180 degrees.

3. Evaluation of Durability/Reliability

A pressure-sensitive adhesive polarizing plate was cut into pieces having a width of 180 mm and a length of 250 mm to prepare samples. The samples were attached to a 19-inch commercially available panel using a laminator, treated in an autoclave (50° C. and 5 atm) for approximately 20 minutes, and then stored for 24 hours under constant temperature/humidity conditions (23° C. and 50% R.H.) to prepare samples.

The heat/humidity resistant durability was evaluated according to the following evaluation criteria by keeping the prepared sample under heat/humidity resistant conditions (60° C. and 90% R.H. for 500 hours) and observing the appearance of bubbles and peels, and the heat-resistant durability was evaluated according to the following evaluation criteria by keeping the samples under a heat-resistant condition (80° C. for 500 hours) and observing the appearance of bubbles and peels. Also, the durability was evaluated by keeping the samples under a heat-resistant or heat/humidity condition and storing the samples at room temperature for 24 hours.

<Evaluation Criteria for Durability>
◯: Bubbles and peels are not generated.
Δ: Bubbles and/or peels are slightly generated.
×: Bubbles and/or peels are highly generated.

4. Measurement of Time-Dependent Changes in Surface Resistance and Surface Resistance A pressure-sensitive adhesive polarizing plate having a pressure-sensitive adhesive formed thereon was cut into pieces having a width of 50 mm and a length of 50 mm to prepare samples. Thereafter, releasable PET films of the test samples attached to the pressure-sensitive adhesive layer were removed, and their surface resistance was then measured.

The surface resistance was measured according to the manufacturer's manual using MCP-HT 450 equipment (commercially available from Mitsubishi chemical, Japan).

The surface resistance (SR1) before a durability test was measured after maintaining the cut test samples for 24 hours under 23° C. and 50% R.H. conditions, removing the releasable PET film from the polarizing plate and then applying a voltage of 500 Volt to the polarizing plate for 1 minute.

The surface resistance (SR2) after the heat/humidity resistant durability test and surface resistance (SR3) after the heat-resistant durability test were measured after maintaining the polarizing plates under the heat/humidity conditions (60° C. and 90% R.H. for 500 hours) or heat-resistant conditions (80° C. for 500 hours), respectively, and then maintaining it again at 23° C. and 50% R.H. for 24 hours, removing the releasable PET film, and then applying a voltage of 500 Volt to the polarizing plates for 1 minute.

5. Measurement of Transparency

Each of the pressure-sensitive adhesive compositions prepared in Examples or Comparative Examples was coated onto a release agent-treated surface of a 38 μm-thick PET film (MRF-38 commercially available from Mitsubishi Corporation) release-treated as a release sheet so that a coating layer could have a thickness after drying of approximately 25 μm, and dried at 110° C. for 3 minutes in an oven to form a pressure-sensitive adhesive layer. A release agent-treated surface of another PET film was laminated onto the pressure-sensitive adhesive layer formed after the drying process, and aged for 7 days under the conditions of 25° C. and 50% R.H. Thereafter, the pressure-sensitive adhesive layer was observed with the naked eye, and the transparency was evaluated according to the following evaluation criteria.

<Evaluation Criteria for Transparency>
◯: A pressure-sensitive adhesive layer is observed as a colorless and transparent layer.
Δ: Slight haze is generated in a pressure-sensitive adhesive layer.
×: Turbid and/or condensed matter is observed on a pressure-sensitive adhesive layer.

The measured physical properties are listed in the following Tables 4 and 5.

TABLE 4

| | Examples | | | | | | |
|---|---|---|---|---|---|---|---|
| | 1 | 2 | 3 | 4 | 5 | 6 | 7 |
| Gel fraction (%) | 79 | 82 | 83 | 79 | 80 | 81 | 80 |
| Pressure-sensitive adhesive strength (gf/25 mm) | 750 | 830 | 810 | 870 | 900 | 755 | 845 |
| Heat-resistant durability | ◯ | ◯ | ◯ | ◯ | ◯ | ◯ | ◯ |
| Damping durability | ◯ | ◯ | ◯ | ◯ | ◯ | ◯ | ◯ |
| Surface resistance (×$10^9$ Ω/□) | 2.2 | 3.8 | 4.5 | 5.9 | 4.3 | 2.3 | 0.3 |
| Δ $SR_B$ (Heat resistance) | 0.15 | 0.22 | 0.2 | 0.25 | 0.2 | 0.13 | 0.2 |
| Δ $SR_A$ (Damping) | 0.4 | 0.47 | 0.48 | 0.72 | 0.58 | 0.35 | 0.42 |
| Transparency | ◯ | ◯ | ◯ | ◯ | ◯ | ◯ | ◯ |

TABLE 5

| | Comparative Examples | | | | |
|---|---|---|---|---|---|
| | 1 | 2 | 3 | 4 | 5 |
| Gel fraction (%) | 81 | 80 | 82 | 78 | 79 |
| Pressure-sensitive adhesive strength (gf/25 mm) | 350 | 780 | 380 | 950 | 230 |
| Heat-resistant durability | ◯ | ◯ | ◯ | ◯ | Δ |
| Damping durability | ◯ | ◯ | Δ | ◯ | ◯ |
| Surface resistance (×$10^9$ Ω/□) | 8.9 | 9.7 | 58 | 49 | 2.5 |
| Δ $SR_B$ (Heat resistance) | 0.96 | 1.02 | 1.3 | 1.2 | 1.3 |
| Δ $SR_A$ (Damping) | 1.6 | 1.5 | 1.8 | 1.9 | 1.8 |
| Transparency | ◯ | ◯ | ◯ | ◯ | × |

According to the present application, a pressure-sensitive adhesive that shows stable antistatic performance, and in particular stably maintains its antistatic performance even when the pressure-sensitive adhesive is kept for an extended time under extreme conditions or conditions in which environmental changes are severe, and also has excellent general physical properties such as pressure-sensitive adhesive properties, durability and workability, may be provided.

What is claimed is:
1. A pressure-sensitive adhesive composition, satisfying the following General Formula 1 and General Formula 2, and comprising:
an acrylic polymer comprising, as polymerized units, 59.5-79.9 parts by weight of (meth)acrylic acid ester monomer, 10 to 20 parts by weight of monomer comprising hydroxyl group, 0.1 to 0.8 parts by weight of monomer comprising carboxyl group and 10 to 20 parts by weight of monomer having an alkylene oxide unit, relative to 100 total parts by weight of said monomers;

an antistatic agent, the antistatic agent comprises bis(trifluoromethanesulfonyl)imide anion; and a silane coupling agent selected from the group consisting of a compound represented by the following Formula 5 and Formula 6:

$$0.35 \leq \Delta SRA = \log SR2 - \log SR1 \leq 0.72 \quad \text{General Formula 1}$$

wherein SR1 is a surface resistance measured after curing the pressure-sensitive adhesive composition and then maintaining it under the conditions of 23° C. and 50% relative humidity for 24 hours, and SR2 is a surface resistance measured after curing the same pressure-sensitive adhesive composition as used for the measurement of SR1, maintaining it under the conditions of 60° C. and 90% relative humidity for 500 hours, and then maintaining it under the conditions of 23° C. and 50% relative humidity for 24 hours, $$0.13 \leq \Delta SRB = \log SR3 - \log SR1 \leq 0.25 \quad \text{General Formula 2}$$

wherein SR1 is the same as defined in the General Formula 1, and SR3 is a surface resistance measured after curing the same pressure-sensitive adhesive composition as used for the measurement of SR1, maintaining it under condition of 80° C. for 500 hours, and then maintaining it under conditions of 23° C. and 50% relative humidity for 24 hours, $$(R_{11})_n Si(R_{12})_{(4-n)} \quad \text{Formula 5}$$

$$(R_{13})_n Si(R_{12})_{(4-n)} \quad \text{Formula 6}$$

wherein $R_{11}$ represents a β-cyanoacetyl group, $R_{13}$ represents an acetoacetyl group or an acetoacetylalkyl group, $R_{12}$ represents an alkoxy group, and n represents an integer ranging from 1 to 3.

2. The pressure-sensitive adhesive composition of claim 1, wherein the (meth)acrylic acid ester monomer is alkyl (meth)acrylate.

3. The pressure-sensitive adhesive composition of claim 1, wherein the monomer having the alkylene oxide unit is represented by the following Formula 1:

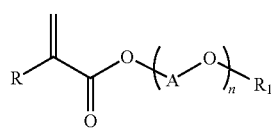

Formula 1 wherein R represents hydrogen or an alkyl group, A represents an alkylene, $R_1$ represents an alkyl group or an aryl group, and n is in the range from 1 to 12.

4. The pressure-sensitive adhesive composition of claim 1, wherein the antistatic agent comprises at least one selected from the group consisting of a metal salt and an ionic compound that is in a liquid phase at room temperature.

5. The pressure-sensitive adhesive composition of claim 4, wherein the ionic compound is an organic salt.

6. The pressure-sensitive adhesive composition of claim 5, wherein the organic salt comprises at least one cation selected from the group consisting of quaternary ammonium, phosphonium, pyridinium, imidazolium, pyrrolidinium and piperidinium.

7. The pressure-sensitive adhesive composition of claim 6, wherein the quaternary ammonium is represented by the following Formula 3:

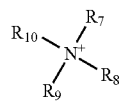

Formula 3 wherein $R_7$ to $R_{10}$ each independently represent hydrogen, alkyl, alkoxy, alkenyl or alkynyl.

8. The pressure-sensitive adhesive composition of claim 7, wherein $R_7$ to $R_{10}$ each independently represent linear or branched alkyl having 1 to 12 carbon atoms, with the proviso that $R_7$ to $R_{10}$ are not an alkyl having the same numbers of carbon atoms at the same time.

9. The pressure-sensitive adhesive composition of claim 4, wherein the metal salt comprises an alkaline metal cation or an alkaline earth metal cation.

10. The pressure-sensitive adhesive composition of claim 1, wherein the antistatic agent comprises a metal salt and an ionic compound that is in a liquid phase at room temperature.

11. The pressure-sensitive adhesive composition of claim 1, wherein the antistatic agent is comprised in an amount of 0.1 to 20 parts by weight, relative to 100 parts by weight of the acrylic polymer.

12. The pressure-sensitive adhesive composition of claim 1, further comprising a multifunctional cross-linking agent.

13. The pressure-sensitive adhesive composition of claim 12, wherein the multifunctional cross-linking agent is an isocyanate cross-linking agent.

14. The pressure-sensitive adhesive composition of claim 1, which has a gel fraction after being cured of 50 to 90 weight%.

15. The pressure-sensitive adhesive composition of claim 1, which a peel strength that is measured after attaching on glass in the form of a pressure-sensitive adhesive, and then peeling it with a peel angle of 180 degrees and a peel rate of 0.3 m/min is in the range of 150 gf/25 mm or more.

16. The pressure-sensitive adhesive composition of claim 1, wherein the acrylic polymer comprises 12 to 20 parts by weight of the monomer comprising hydroxyl group.

17. The pressure-sensitive adhesive composition of claim 1, wherein the antistatic agent is present in the composition in an amount of 2 to 5 parts by weight, relative to 100 parts by weight of the acrylic polymer.

18. The pressure-sensitive adhesive composition of claim 1, wherein the antistatic agent comprises both trioctylmethylammonium-bis(trifluoromethanesulfonyl)imide and lithium bis(trifluoromethanesulfonyl)imide.

19. The pressure-sensitive adhesive composition of claim 1, wherein the (meth)acrylic acid ester monomer comprises at least one of n-butyl (meth)acrylate or ethyl (meth)acrylate, the monomer comprising hydroxyl group comprises 2-hydroxyethyl (meth)acrylate, the monomer comprising carboxyl group comprises (meth)acrylic acid, and the monomer having an alkylene oxide unit comprises at least one of methoxy ethyleneglycol acrylate or ethoxyethoxyethyl acrylate.

20. The pressure-sensitive adhesive composition of claim 19, wherein the (meth)acrylic acid ester monomer comprises both n-butyl (meth)acrylate and ethyl (meth)acrylate.

21. The pressure-sensitive adhesive composition of claim 19, wherein the monomer having an alkylene oxide unit comprises both methoxy ethyleneglycol acrylate and ethoxyethoxyethyl acrylate.

22. A polarizing plate comprising:

a polarizer; and a pressure-sensitive adhesive layer which is formed on one or both sides of the polarizer, and comprises a cured product of the pressure-sensitive adhesive composition defined of claim 1, the pressure-sensitive adhesive layer being for attaching the polarizing plate to a liquid crystal panel.

23. A liquid crystal display (LCD) device comprising:

a liquid crystal panel; and the polarizing plate of claim 22 which is attached to one or both sides of the liquid crystal panel.

\* \* \* \* \*